US010255782B1

(12) United States Patent
Ghannam et al.

(10) Patent No.: US 10,255,782 B1
(45) Date of Patent: Apr. 9, 2019

(54) VEHICLE FLOOD DETECTION

(71) Applicant: Ford Global Technologies, LLC, Dearborn, MI (US)

(72) Inventors: Mahmoud Yousef Ghannam, Canton, MI (US); Aed M. Dudar, Canton, MI (US); David James Tippy, Ann Arbor, MI (US); Darren Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/012,447

(22) Filed: Jun. 19, 2018

(51) Int. Cl.
| G01F 23/14 | (2006.01) |
| G08B 21/10 | (2006.01) |
| G08G 1/00 | (2006.01) |
| G01S 15/93 | (2006.01) |
| B60R 21/00 | (2006.01) |

(52) U.S. Cl.
CPC .............. *G08B 21/10* (2013.01); *G08G 1/00* (2013.01); *B60R 2021/0016* (2013.01); *G01S 15/931* (2013.01)

(58) Field of Classification Search
CPC .. G08B 21/10; G08G 1/00; B60R 2021/0016; B60R 11/04; G01S 15/931; G01F 23/0061
See application file for complete search history.

(56) References Cited

U.S. PATENT DOCUMENTS

| 6,650,244 | B1* | 11/2003 | Chen | G08B 21/20 340/425.5 |
| 9,227,479 | B2* | 1/2016 | Clarke | B60G 17/0165 |
| 9,714,038 | B1* | 7/2017 | He | H04L 67/12 |
| 9,805,601 | B1 | 10/2017 | Fields et al. | |
| 10,018,475 | B2* | 7/2018 | Hakeem | G01C 21/3694 |
| 2003/0222768 | A1* | 12/2003 | Chen | G08B 21/20 340/425.5 |
| 2012/0106017 | A1* | 5/2012 | Schumacher | B60L 3/04 361/114 |
| 2014/0293056 | A1* | 10/2014 | Popham | G01F 23/0061 348/148 |
| 2015/0046032 | A1* | 2/2015 | Clarke | B60G 17/0165 701/37 |
| 2015/0046071 | A1* | 2/2015 | Clarke | B60W 30/18018 701/112 |
| 2015/0170505 | A1* | 6/2015 | Frew | G08B 25/10 340/539.22 |

(Continued)

FOREIGN PATENT DOCUMENTS

| EP | 2341368 A1 | 7/2011 |
| KR | 20170055178 A | 5/2017 |

*Primary Examiner* — An T Nguyen
(74) *Attorney, Agent, or Firm* — Frank Lollo; James P. Muraff; Neal, Gerber & Eisenberg LLP

(57) ABSTRACT

Method and apparatus are disclosed for vehicle flood detection. An example vehicle includes an engine, a humidity sensor, a GPS receiver to determine a vehicle location, a communication module, and a control module. The control module is to collect, via the humidity sensor, a humidity measurement within the engine and collect a humidity level of the vehicle location. The control module also is to identify a flooding event when the humidity measurement exceeds the humidity level by a predetermined threshold and record the flooding event with a remote server via the communication module.

18 Claims, 4 Drawing Sheets

(56) References Cited

U.S. PATENT DOCUMENTS

2016/0288645 A1* 10/2016 Popham ................ B60W 50/14
2018/0073879 A1* 3/2018 Hakeem ............. G01C 21/3694
2018/0218596 A1* 8/2018 Castelli ................ H04W 76/10

* cited by examiner

VEHICLE FLOOD DETECTION

TECHNICAL FIELD

The present disclosure generally relates to vehicles and, more specifically, to vehicle flood detection.

BACKGROUND

Occasionally, an area may be flooded due to inclement weather conditions (e.g., heavy rainfall, overflowing rivers, hurricanes, etc.). In such instances, vehicles located within the flooded area may be damaged by the flood water. For instance, carpets or seats may be water-stained, metal components (e.g., body panels, a frame, screws, etc.) may rust, and/or other easily observable damage may occur. In other instances, damage to a vehicle resulting from flooding may be less observable. Oftentimes, vehicles that are damaged by flooding are subsequently sold to purchasers who are unaware of the flood-damage as a result of the damage being covered up and/or unobservable.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle flood detection. An example disclosed vehicle includes an engine, a humidity sensor, a GPS receiver to determine a vehicle location, a communication module, and a control module. The control module is to collect, via the humidity sensor, a humidity measurement within the engine and collect a humidity level of the vehicle location. The control module also is to identify a flooding event when the humidity measurement exceeds the humidity level by a predetermined threshold and record the flooding event with a remote server via the communication module.

In some examples, the control module is located above a predefined vehicle flood level to deter the control module from being submerged by the flooding event.

In some examples, the control module collects the humidity measurement in response to detecting a flood characteristic. Some such examples further include a camera. In such examples, the control module detects the flood characteristic via the camera. Some such examples further include a proximity sensor. In such examples, the control module detects the flood characteristic via the proximity sensor. Some such examples further include a rain sensor. In such examples, the control module detects the flood characteristic via the rain sensor. Some such examples further include a water level sensor positioned adjacent a vehicle undercarriage. In such examples, the control module detects the flood characteristic via the water level sensor. Some such examples further include a dedicated short-range communication (DSRC) module for vehicle-to-everything (V2X) communication. In such examples, the control module detects the flood characteristic based upon the V2X communication. In some examples, the control module detects the flood characteristic based upon the vehicle location and localized weather data.

In some examples, the control module collects the humidity level from a remote weather server via the communication module.

In some examples, the control module includes memory. In such examples, the control module stores the flooding event in the memory and subsequently disconnects from a battery. Some such examples further include a battery management system that is configured to disconnect the control module from the battery. Some examples further include an alternative power source that is located above a predefined vehicle flood level and is configured to power the control module in response to the control module identifying the flooding event. In some such examples, the alternative power source includes a solar panel.

In some examples, the control module presents a flood alert to a user upon identifying the flooding event. Some examples further include an autonomy unit that is configured to autonomously performs motive functions when the flooding event is identified. Some examples further include an engine control module that is configured to prevent the engine from being started when the flooding event is identified and the engine is inactive. In some examples, when the flooding event is recorded with the remote server, data of the flooding event is retrievable only by a certified operator and is erasable only by an authorized operator.

An example disclosed method includes determining a current location of a vehicle via a GPS receiver. The example disclosed vehicle also includes collecting, via a humidity sensor, a humidity measurement within an engine and collecting a humidity level of the current location via a communication module of the vehicle. The example disclosed vehicle also includes identifying, via a processor, a flooding event responsive to determining that the humidity measurement exceeds the humidity level by a predetermined threshold and recording, via the communication module, the flooding event with a remote server.

In some examples, the humidity measurement is collected in response to detecting a flood characteristic.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
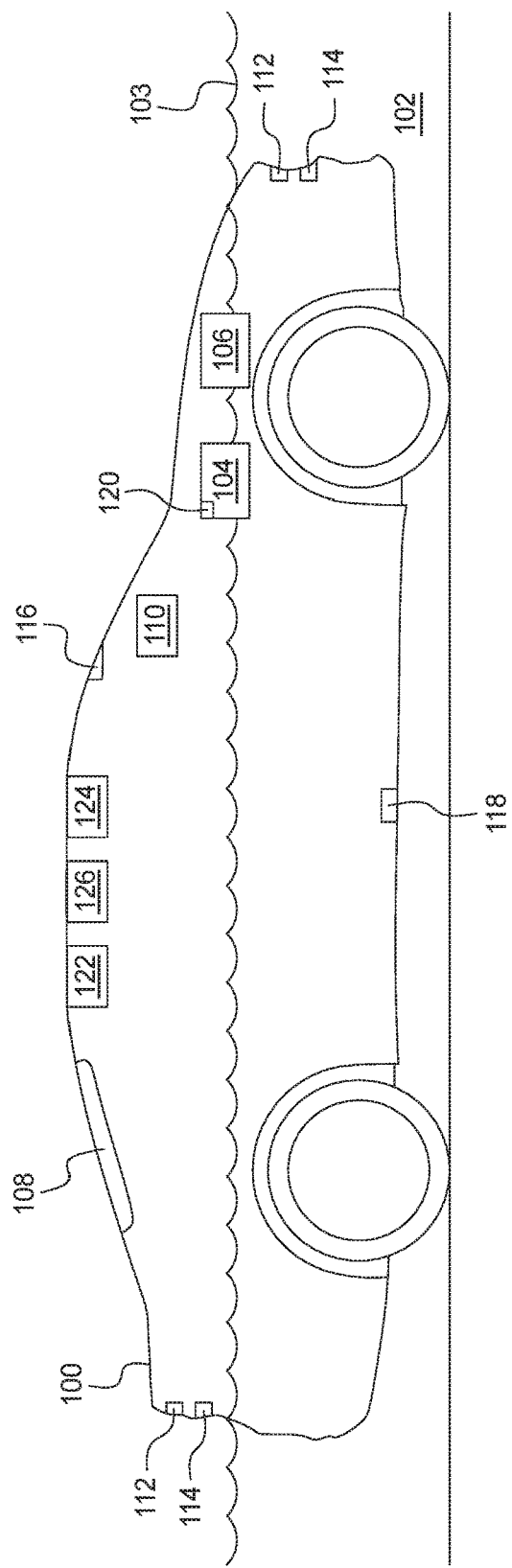
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Occasionally, an area may be flooded due to inclement weather conditions (e.g., heavy rainfall, overflowing rivers, hurricanes, etc.). In such instances, vehicles located within the flooded area may be damaged by the flood water. For instance, carpets or seats may be water-stained, metal components (e.g., body panels, a frame, screws, etc.) may rust, and/or other easily observable damage may occur. In other instances, damage to a vehicle resulting from flooding may be less observable. Oftentimes, vehicles that are damaged by flooding are subsequently sold to purchasers who are unaware of the flood-damage as a result of the damage being covered up and/or unobservable.

Example methods and apparatus disclosed herein record when a vehicle has been involved in a flooding event to enable people (e.g., consumers, lessees, original equipment manufacturers, etc.) to subsequently identify that the vehicle has potentially been damaged by a flooding event. Examples disclosed herein include various sensor(s), communication devices, and/or other electronic device(s) or system(s) (e.g., a proximity sensor, a rain sensor, a water level sensor, a wet sensor, a camera, a dedicated short-range communication module, a GPS receiver, a wiper system, a traction control system, etc.) that are configured to detect a flood characteristic (e.g., standing water, an elevated water level, heavy rain, etc.). Further, the vehicle includes (1) a humidity sensor that is configured to collect a humidity measurement within an engine of the vehicle and (2) a communication module that is configured to collect a known humidity level from a weather service for a current location of the vehicle. A controller of the vehicle compares the humidity measurement of the engine to the humidity level of the vehicle location. The controller detects that water is within the engine and, in turn, detects the vehicle is involved in a flooding event if the humidity measurement of the engine exceeds the known humidity level of the vehicle location by a predetermined threshold. Upon detecting that the vehicle is involved in a flooding event, the controller records the flooding event with a remote server that is accessible by others and/or performs other vehicle functions to protect the vehicle against water damage.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

As illustrated in FIG. 1, the vehicle 100 is partially submerged by water 102 at a flood level 103 (e.g., a predefined flood level) of the vehicle 100. The vehicle 100 of the illustrated example includes an engine 104, a battery 106, and a solar panel 108. The engine 104 of the illustrated example includes an internal combustion engine, an electric motor, and/or any other power source that propels movement of the vehicle 100. In some examples, the battery 106 is a starter battery that provides energy to activate an internal combustion engine of the engine 104. Once activated, power is supplied to the internal combustion engine via an alternator. Further, in some examples, the battery 106 provides electricity to an electric motor of the engine 104 to propel the vehicle 100. In such examples, the battery 106 may include a single battery cell and/or a battery pack that includes a plurality of battery cells connected together. Additionally or alternatively, the battery 106 is configured to provide energy to other electrical components of the vehicle 100. Further, the solar panel 108 and/or another alternative power source is configured to recharge the battery 106 and/or to provide energy to other electrical components of the vehicle 100. In the illustrated example, the solar panel 108 captures solar energy (e.g., via sunlight), transforms the solar energy into electricity, and provides the electricity to the battery 106 and/or other electrical component(s) of the vehicle 100.

In the illustrated example, the vehicle 100 also includes a global positioning system (GPS) receiver 110, one or more proximity sensors 112, one or more cameras 114, a rain sensor 116, and a water level sensor 118. The GPS receiver 110 receives a signal from a global positioning system to determine a location of the vehicle 100. The proximity sensors 112 are configured to monitor a surrounding area of the vehicle to detect a presence and/or location of nearby object(s). For example, the proximity sensors 112 include radar sensor(s), lidar sensor(s), ultrasonic sensor(s), and/or any other sensor(s) configured to detect a presence and/or location of nearby object(s). For example, a radar sensor detects and locates an object via radio waves, a lidar sensor detects and locates an object via lasers, and an ultrasonic sensor detects and locates an object via ultrasound waves. The cameras 114 capture image(s) and/or video to facilitate a detection, identification, and/or localization of nearby object(s) within a surrounding area of the vehicle. The rain sensor 116 detects when it is raining within the surrounding environment of the vehicle 100. In some examples, the rain sensor 116 is a light sensor located on a windshield of the vehicle 100 (e.g., behind a rearview mirror) that detects the presence of rain based upon the total internal reflection of infrared light. The water level sensor 118 of the vehicle 100 detects when a water level of the water 102 surpasses a predetermined threshold level. For example, the water level sensor 118 is positioned near an undercarriage of the vehicle 100 to detect when the water level of the water 102 rises above the undercarriage. Additionally or alternatively, a water level sensor is located at other portion(s) of the vehicle 100 to detect when the water level surpasses those other portion(s) of the vehicle 100.

The vehicle 100 of the illustrated example also includes a humidity sensor 120. As illustrated in FIG. 1, the humidity sensor 120 is positioned within, coupled to, and/or positioned near the engine 104 to collect humidity measurements within a chamber (e.g., an intake manifold) of the engine 104. The humidity sensor 120 is configured to collect humidity measurements of the engine 104 to monitor for water within a chamber of the engine 104. In some examples, water enters the engine 104 upon the water 102 reaching the flood level 103 and/or any other level that reaches and/or surpasses the engine 104 of the vehicle 100. For example, the water 102 may enter the engine 104 through a main air filter point and/or an evaporative emission control system (also referred to as an EVAP) of the engine 104.

In the illustrated example, the vehicle 100 also includes a communication module 122. For example, the communication module 122 is a dedicated short-range communication (DSRC) module. The communication module 122 is configured to communicate with other vehicle(s) (referred to as vehicle-to-vehicle or V2V communication), infrastructure (referred to as vehicle-to-infrastructure or V2I communication), and/or any electrical device (referred to as vehicle-to-everything or V2X communication) via DSRC communication. For example, the communication module 122 includes antenna(s), radio(s) and software to establish wireless connections (e.g., to broadcast and receive messages) with other vehicle-based modules, infrastructure-based modules, and mobile device-based modules. That is, DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones. Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The vehicle 100 of the illustrated example also includes a communication module 124 that includes wired or wireless network interfaces to enable communication with external networks. The communication module 124 also includes hardware (e.g., processors, memory, storage, antenna, etc.) and software to control the wired or wireless network interfaces. In the illustrated example, the communication module 124 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m), local area wireless network (including IEEE 802.11 a/b/g/n/ac or others), Wireless Gigabit (IEEE 802.11ad), etc.). In some examples, the communication module 124 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicate with the external network via the coupled mobile device. The external network(s) (e.g., a network 320 of FIG. 3) may be a public network, such as the Internet; a private network, such as an intranet; or combinations thereof, and may utilize a variety of networking protocols now available or later developed including, but not limited to, TCP/IP-based networking protocols.

As illustrated in FIG. 1, the vehicle 100 also includes a control module 126 that is configured to detect a flooding event of the vehicle 100. For example, the control module 126 monitors for a flooding event of the vehicle 100 upon identifying a flood characteristic near the vehicle 100. As used herein, a "flooding event" refers to an occurrence during which standing water of a flood enters and/or otherwise contacts an engine and/or other electrical component(s) of the vehicle. During a flooding event, the standing water oftentimes damages an engine and/or other electrical component(s) of a vehicle. As used herein, a "flood characteristic" refers to a characteristic of flooding event, such as standing water, elevated water levels, heavy rain, etc.

In the illustrated example, the control module 126 of the vehicle 100 is located above the flood level 103 to deter the control module 126 from being damaged by the water 102 during a flooding event. Additionally or alternatively, the control module 126 is water-repellent, water-resistant, and/or waterproof to deter the control module 126 from being damaged by the water 102 during a flooding event.

In operation, the control module 126 monitors for flood characteristic(s) near the vehicle 100 while the engine 104 is active and/or inactive. In some examples, the control module 126 detects a flood characteristic via one or more of the proximity sensors 112, the rain sensor 116, the water level sensor 118, other sensor(s) of the vehicle 100 (e.g., a wet sensor) and/or combinations thereof. For example, one or more of the proximity sensors 112 and/or the water level sensor 118 detect a flood characteristic by identifying when the water 102 is at a water level that is associated with a potential flooding event. Further, the rain sensor 116 detects a flood characteristic by identifying heavy rain levels associated with a potential flooding event. In some examples, the control module 126 detects a flood characteristic based upon image(s) and/or video collected by one or more of the cameras 114. For example, the control module 126 detects a flood characteristic upon identifying within the collected image(s) and/or video that the water 102 is at a water level associated with a potential flooding event. Further, in some examples, the control module 126 detects a flood characteristic based upon information collected from the communication module 122. For example, the communication module 122 collects, via V2X communication, identification of a flood characteristic from a nearby vehicle and/or infrastructure module that has detected the flood characteristic. In other examples, the control module 126 detects a flood characteristic based upon information collected from the communication module 124, the GPS receiver 110, and/or system(s) of the vehicle 100 (e.g., a wiper system, a traction control system, etc.). For example, the control module 126 also is configured to detect a flood characteristic based upon (1) a current location of the vehicle 100 as determined by the GPS receiver 110 and (2) localized weather data retrieved from a weather service via the communication module 124. For example, weather service(s) (e.g., the National Weather Service) include remote weather server(s) (e.g., remote servers 318 of FIG. 3) that store localized weather data (e.g., temperature, barometric pressure, wind speed and direction, precipitation levels, chances of precipitation, flood levels, pollen counts, etc.) for different geographic locations as collected by various national centers, regional centers, and/or local weather service offices. The control module 126 is configured to retrieve localized weather data from a weather service via the communication module 124 based on the current vehicle location as determined by the GPS receiver 110.

In response to detecting a flood characteristic, the control module 126 collects a humidity measurement within the engine 104 via the humidity sensor 120. Further, the control module 126 collects a humidity level of the current location of the vehicle 100. That is, the control module 126 collects a known humidity level of the environment in which the vehicle 100 is located. For example, the control module 126 collects the humidity level, via the communication module 124, from a remote weather server (e.g., one of the remote servers 318) of a weather service based on the current vehicle location as determined by the GPS receiver 110.

Further, the control module 126 identifies whether there is a flooding event of the vehicle 100 based upon the humidity measurement collected by the humidity sensor 120 and the known humidity level of the ambient environment collected from the weather service. That is, to determine whether there is a flooding event of the vehicle 100, the control module 126 identifies whether water (e.g., the water 102) has entered the engine 104 by comparing the humidity measurement of the engine 104 to the humidity level of the ambient environment. For example, the water 102 enters the engine 104 through the main air filter point and/or EVAP when the water level of the water 102 reaches the flood level 103.

In the illustrated example, the control module 126 detects that the water 102 has entered the engine 104 when the humidity measurement of the engine 104 is greater than the humidity level of the ambient environment by a predetermined threshold. For example, the humidity within the engine 104 is greater than the humidity of the ambient environment during a flooding event due to the water 102 entering in enclosed chambers within the engine 104. In some examples, the predetermined threshold is zero. In other examples, the predetermined threshold is greater than zero to account for error(s) in measurement, evaporation that occurs during normal operation of the engine 104, etc.

In turn, the control module 126 identifies of a flooding event of the vehicle 100 in response to determining that the humidity measurement of the engine 104 is greater than the humidity level of the ambient environment by the predetermined threshold. Further, the control module 126 identifies that the vehicle 100 is not in a flooding event in response to determining that the humidity measurement of the engine 104 is not greater than the humidity level of the ambient environment by the predetermined threshold. That is, the control module 126 identifies that the vehicle 100 is not in a flooding event when the humidity measurement of the engine 104 is equal and/or substantially similar to the humidity level of the ambient environment. For example, if the humidity level of the ambient environment is 30%, the control module 126 identifies that the vehicle 100 is not in a flooding event if the humidity measurement of the engine 104 is equal and/or substantially similar to 30% (e.g., within the predetermined threshold of 30%). In contrast, the control module 126 identifies that the vehicle 100 is in a flooding event if the humidity measurement of the engine 104 exceeds 30% by at least the predetermined threshold.

Upon identifying a flooding event of the vehicle 100, the control module 126 records the flooding event of the vehicle 100 with a remote server (e.g., one of the remote servers 318) via the communication module 124. For example, the control module 126 records the flooding event of the vehicle 100 with a remote server for subsequent consumer reports of the vehicle 100 to enable others to identify that the vehicle 100 has been involved in a flooding event. Additionally or alternatively, the flooding event of the vehicle 100 is recorded within memory (e.g., memory 312 of FIG. 3). For example, upon identifying a flooding event, the control module 126 disconnects from the battery 106 upon storing the flooding event in its memory and/or recording the flooding event with a remote server. The control module 126 is configured to disconnect from the battery 106 to protect the control module 126 from damage when the water 102 of the flood event reaches the battery 106 of the vehicle 100. In some examples, the vehicle 100 includes a battery management system (e.g., a battery management system 326 of FIG. 3) that is configured to disconnect the control module 126 from the battery 106 upon the control module 126 identifying the flooding event. Further, in some examples, the control module 126 is powered by the solar panel 108 and/or another alternative power source located above the flood level 103 in response to the control module 126 identifying the flooding event and disconnecting from the battery 106. In such examples, the control module 126 continues to operate during the flooding event after the water 102 reaches the battery 106. Additionally or alternatively, the control module 126 presents a flood alert to a user of the vehicle 100 (e.g., via an infotainment head unit 302 of FIG. 3, a mobile device of the user, etc.) upon identifying the flooding event to inform the user that the vehicle 100 has recently been involved in a flooding event.

Figure 2:
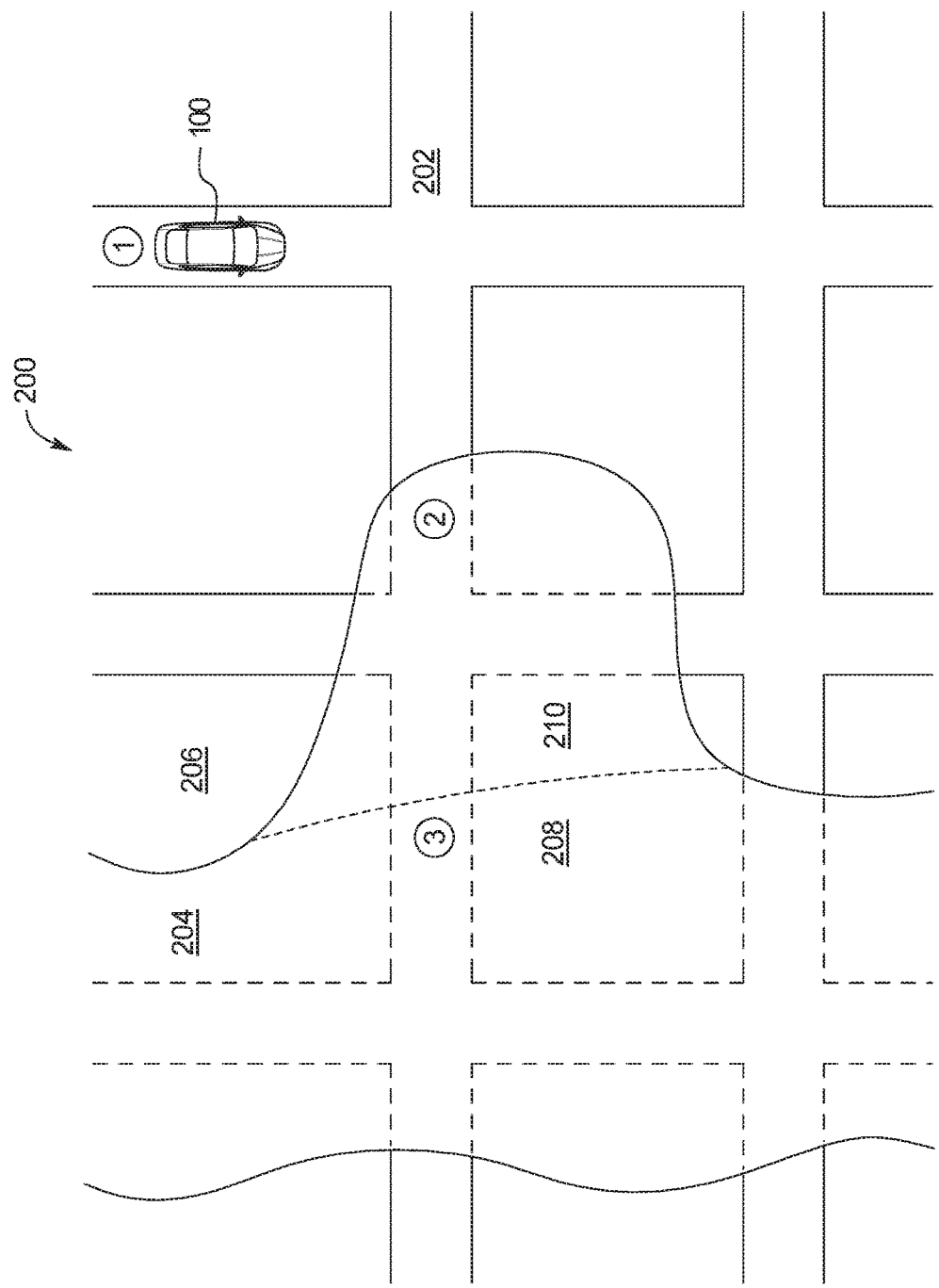
FIG. 2 depicts an example map that includes a representation of the vehicle of FIG. 1.

FIG. 2 depicts an example map 200 that includes a representation of the vehicle 100. The map 200 includes roads 202 with submerged terrain 204 and unsubmerged terrain 206. Further, in the illustrated example, a portion 208 of the submerged terrain 204 is submerged by a water level that corresponds with a flooding event, and another portion 210 of the submerged terrain 204 is submerged by a water level that does not correspond with a flooding event (e.g., the water level of the portion 210 is less than that of a flooding event).

In some instances, as represented by numeral (1) in FIG. 2, the vehicle 100 is located on the unsubmerged terrain 206 away from the submerged terrain 204. In some such instances, the control module 126 does not detect a flood characteristic and, in turn, does not identify a flooding event of the vehicle 100. In other such instances, the control module 126 detects a flood characteristic when the vehicle 100 is located away from the submerged terrain 204. For example, the rain sensor 116 may detect a flood characteristic as a result of heavy rain in the area. In such instances, the control module 126 collects a humidity level for the current location of the vehicle 100, collects a humidity measurement of the engine 104 from the humidity sensor 120, and identifies that there is no flooding event for the vehicle 100 upon comparing the humidity level and the humidity measurement.

In other instances, as represented by numeral (2) in FIG. 2, the vehicle 100 is located on and/or adjacent to the portion 210 of the submerged terrain 204 that is not flooded. In such instances, the control module 126 may detect a flood characteristic via one or more of the proximity sensors 112, the rain sensor 116, the water level sensor 118, other sensor(s) of the vehicle 100 (e.g., a wet sensor), one or more of the cameras 114, the communication module 122, the communication module 124, the GPS receiver 110, system(s) of the vehicle 100 (e.g., a wiper system, a traction control system, etc.), and/or combinations thereof. Upon identifying a flood characteristic, the control module 126 collects a humidity level for the current location of the vehicle 100, collects a humidity measurement of the engine 104 from the humidity sensor 120, and identifies that there is no flooding event for the vehicle 100 upon comparing the humidity level and the humidity measurement.

In yet other instances, as represented by numeral (3) in FIG. 2, the vehicle 100 is located on the portion 208 of the submerged terrain 204 that is flooded. In such instances, the control module 126 may detect a flood characteristic via one or more of the proximity sensors 112, the rain sensor 116, the water level sensor 118, other sensor(s) of the vehicle 100 (e.g., a wet sensor), one or more of the cameras 114, the communication module 122, the communication module 124, the GPS receiver 110, system(s) of the vehicle 100 (e.g., a wiper system, a traction control system, etc.), and/or combinations thereof. Upon identifying a flood characteristic, the control module 126 collects a humidity level for the current location of the vehicle 100, collects a humidity measurement of the engine 104 from the humidity sensor 120, and identifies that there is flooding event of the vehicle 100 upon comparing the humidity level and the humidity measurement. Upon identifying the flooding event, the control module 126 records the flooding event with a remote server, stores the flooding event in memory of the control module, disconnects from the battery 106, connects to an alternative power source, and/or emits an alert to a user of the vehicle 100. Further, in some examples, the vehicle 100 is autonomously driven away from the flooding event (e.g., via an autonomy unit 322 of FIG. 3) when the engine 104 of the vehicle 100 is active during identification of a flooding event. In some examples, the engine 104 is prevented from being started (e.g., via an engine control unit 324 of FIG. 3) to avoid damage to engine 104 when the engine 104 is inactive during identification of the flooding event.

Figure 3:
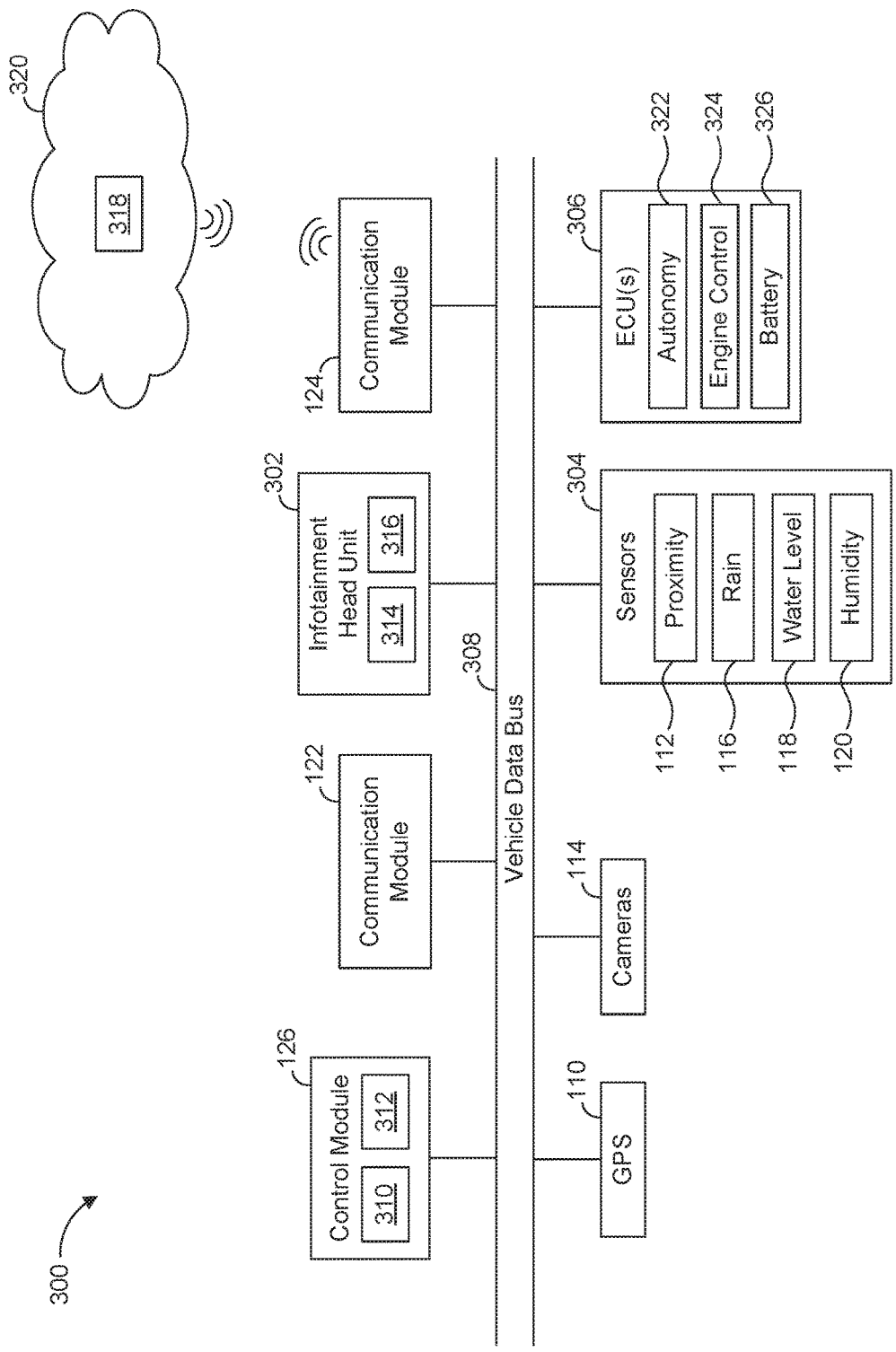
FIG. 3 is a block diagram of electronic components of the vehicle of FIG. 1.

FIG. 3 is a block diagram of electronic components 300 of the vehicle 100. As illustrated in FIG. 3, the electronic components 300 includes the control module 126, the communication module 122, an infotainment head unit 302, the communication module 124, the GPS receiver 110, the cameras 114, sensors 304, electronic control units (ECUs) 306, and a vehicle data bus 308.

The control module 126 includes a processor 310 (also referred to as microcontroller unit and a controller) and memory 312. In some examples, the control module 126 is separate from any of the ECUs 306. Alternatively, in some examples, the control module 126 incorporated into one of the ECUs 306 of the vehicle 100. The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 302 provides an interface between the vehicle 100 and a user. The infotainment head unit 302 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a display 314 (e.g., a heads-up display, a center console display such as a liquid crystal display (LCD), an organic light emitting diode (OLED) display, a flat panel display, a solid state display, etc.), and/or speakers 316. In the illustrated example, the infotainment head unit 302 includes hardware (e.g., a processor or controller, memory, storage, etc.) and software (e.g., an operating system, etc.) for an infotainment system (e.g., SYNC® and MyFord Touch® by Ford®). Additionally, the infotainment head unit 302 displays the infotainment system on, for example, the display 314. Additionally or alternatively, the control module 126 presents a flood alert to the user via the display 314 upon identifying a flooding event.

As illustrated in FIG. 3, the communication module 124 wirelessly communicates with one or more remote servers 318 via a network 320 (e.g., a public network such as the Internet, a private network such as an intranet, combination(s) thereof, etc.). For example, the communication module 124 wirelessly communicates flooding event notification(s) to one of the remote servers 318 for recordation of the flooding event(s) of the vehicle 100. In some examples, flooding event(s) recorded with one or more of the remote servers 318 is retrievable only by a certified operator and is erasable only by an authorized operator (e.g., a person with a high authorization level). Additionally or alternatively, the remote servers 318 include a remote weather server of a weather service. For example, the remote weather server may store known humidity levels and/or known flooding events for various geographic locations. In some examples, the communication module 124 wirelessly communicates with the remote weather server to enable the control module 126 to collect the humidity level of the current location of the vehicle 100. Further, in some examples, the control module 126 detects the flood characteristic for the vehicle 100 based upon information collected from the remote weather server via the communication module 124.

The sensors 304 are arranged in and/or around the vehicle 100 to monitor properties of the vehicle 100 and/or an environment in which the vehicle 100 is located. One or more of the sensors 304 may be mounted to measure properties around an exterior of the vehicle 100. Additionally or alternatively, one or more of the sensors 304 may be mounted inside a cabin of the vehicle 100 or in a body of the vehicle 100 (e.g., an engine compartment, wheel wells, etc.) to measure properties in an interior of the vehicle 100. For example, the sensors 304 include accelerometers, odometers, tachometers, pitch and yaw sensors, wheel speed sensors, microphones, tire pressure sensors, biometric sensors and/or sensors of any other suitable type. In the illustrated example, the sensors 304 include the proximity sensors 112, the rain sensor 116, the water level sensor 118, and the humidity sensor 120.

The ECUs 306 monitor and control the subsystems of the vehicle 100. For example, the ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 100 may have dozens of the ECUs 306 that are positioned in various locations around the vehicle 100 and are communicatively coupled by the vehicle data bus 308.

In the illustrated example, the ECUs 306 include an autonomy unit 322, an engine control unit 324, and a battery management system 326. The autonomy unit 322 controls performance of autonomous and/or semi-autonomous driving maneuvers of the vehicle 100 based upon, at least in part, image(s) and/or video captured by vehicle cameras (e.g., the cameras 114), data collected by proximity sensors (e.g., the proximity sensors 112), and/or other collected data. For example, when the engine 104 is active and the control module 126 identifies a flooding event, the autonomy unit 322 is configured to autonomously perform motive functions of the vehicle 100 to maneuver the vehicle away from the flooding event. Further, the engine control unit 324 control(s) operation of the engine 104 of the vehicle 100. For example, when the engine 104 is inactive and the control module 126 identifies a flooding event, the engine control unit 324 prevents the engine 104 from being started to deter the engine 104 from being damaged by the flooding event. The battery management system 326 of the illustrated example control(s) operation of the battery 106 and/or alternative power source(s) (e.g., the solar panel 108 of FIG. 1) of the vehicle 100. For example, the battery management system 326 disconnects the control module 126 from the battery 106 in response to the control module 126 identifying a flooding event to protect the control module 126 from the flooding event. Further, in some examples, the battery management system 326 causes an alternative power source (e.g., the solar panel 108 of FIG. 1) to power the control module 126 upon disconnecting the control module 126 from the battery 106 to enable the control module 126 to continue to operate during the flooding event.

The vehicle data bus 308 communicatively couples the GPS receiver 110, the cameras 114, the communication module 122, the communication module 124, the control module 126, the infotainment head unit 302, the sensors 304, and the ECUs 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
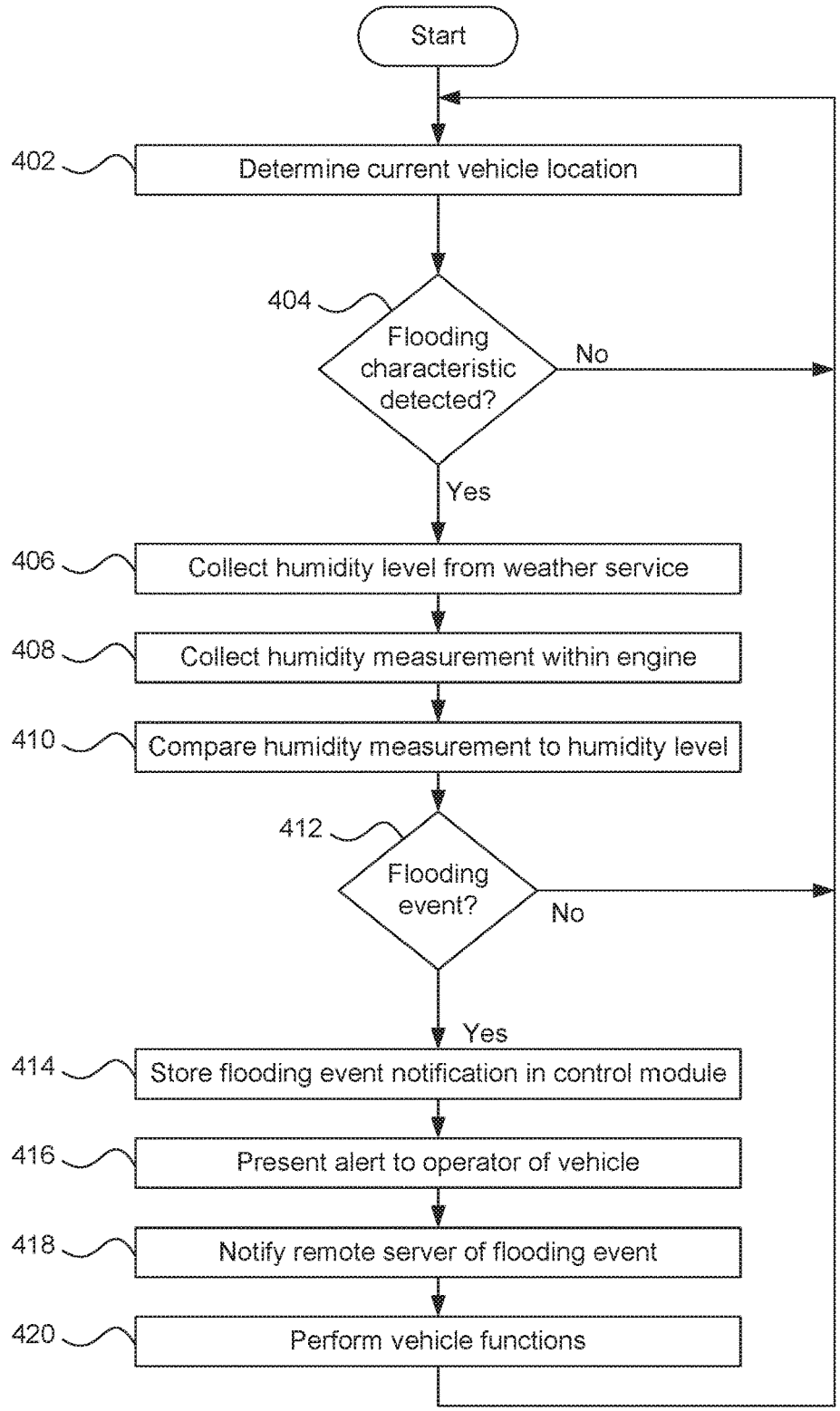
FIG. 4 is a flowchart for detecting flooding of a vehicle in accordance with the teachings herein.

FIG. 4 is a flowchart of an example method 400 to detect flooding of a vehicle. The flowchart of FIG. 4 is representative of machine readable instructions that are stored in memory (such as the memory 312 of FIG. 3) and include one or more programs which, when executed by a processor (such as the processor 310 of FIG. 3), cause the vehicle 100 to implement the example control module 126 of FIGS. 1 and 3. While the example program is described with reference to the flowchart illustrated in FIG. 4, many other methods of implementing the example control module 126 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the GPS receiver 110 determines the current location of the vehicle 100. At block 404, the control module 126 determines whether a flood characteristic is detected at and/or near the vehicle 100. For example, the control module 126 detects a flood characteristic based upon (i) data collected by one or more of the proximity sensors 112, (ii) image(s) and/or video collected by one or more of the cameras 114, (iii) data collected by the rain sensor 116, (iv) data collected by the water level sensor 118, (iv) based upon V2X communication received by the communication module 122, and/or (v) the current location of the vehicle 100 and corresponding localized weather data. In response to the control module 126 not detecting a flood characteristic, the method 400 returns to block 402. Otherwise, in response to the control module 126 detecting a flood characteristic, the method 400 proceeds to block 406.

At block 406, the control module 126 collects a humidity level of the current location of the vehicle 100 from a weather service. For example, the control module 126 collects the humidity level of the current location of the vehicle 100 via wireless communication between the communication module 124 and a remote weather server (e.g., one of the remote servers 318 of FIG. 3) of a weather service. At block 408, the control module 126 collects a humidity measurement from within the engine 104. For example, the control module 126 collects the humidity measurement from the humidity sensor 120 of the engine 104. At block 410, the control module 126 compares the humidity measurement to the humidity level.

At block 412, the control module 126 determines whether there is a flooding event. For example, the control module 126 identifies a flooding event in response to determining that the humidity measurement exceeds the humidity level by a predetermined threshold (e.g., by 10% humidity, 20% humidity, 30% humidity, etc.). In response to the control module 126 not identifying a flooding event, the method 400 returns to block 402. Otherwise, in response to the control module 126 identifying a flooding event, the method 400 proceeds to block 414.

At block 414, the control module 126 store a notification of the flooding event in the memory 312 of the control module 126. At block 416, the control module 126 presents a flood alert to a user, for example, via the infotainment head unit 302 of the vehicle 100 and/or a mobile device of the user. At block 416, the control module 126 notifies a remote server (e.g., one of the remote servers 318 of FIG. 3) of the flooding event of the vehicle 100. That is, the control module 126 records the flooding event with a remote server via the communication module 124 of the vehicle 100. At block 420, the control module 126 causes one or more other vehicle(s) functions to be performed. For example, the control module 126 causes the battery management system 326 to disconnect the control module 126 from the battery 106 and/or to connect the control module 126 to an alternative power source (e.g., the solar panel 108). In some examples, the control module 126 causes the engine control unit 324 to prevent the engine 104 from starting when the vehicle 100 is parked within the flooding event. Further, in some examples, the control module 126 instructs the autonomy unit 322 to maneuver the vehicle 100 away from the flooding event.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    an engine;
    a humidity sensor;
    a GPS receiver to determine a vehicle location;
    a communication module; and
    a control module to:
       collect, via the humidity sensor, a humidity measurement within the engine in response to detecting a flood characteristic;
       collect a humidity level of the vehicle location;
       identify a flooding event when the humidity measurement exceeds the humidity level by a predetermined threshold; and
       record the flooding event with a remote server via the communication module.

2. The vehicle of claim 1, wherein the control module is located above a predefined vehicle flood level to deter the control module from being submerged by the flooding event.

3. The vehicle of claim 1, further including a camera, wherein the control module detects the flood characteristic via the camera.

4. The vehicle of claim 1, further including a proximity sensor, wherein the control module detects the flood characteristic via the proximity sensor.

5. The vehicle of claim 1, further including a rain sensor, wherein the control module detects the flood characteristic via the rain sensor.

6. The vehicle of claim 1, further including a water level sensor positioned adjacent a vehicle undercarriage, wherein the control module detects the flood characteristic via the water level sensor.

7. The vehicle of claim 1, further including a dedicated short-range communication (DSRC) module for vehicle-to-everything (V2X) communication, wherein the control module detects the flood characteristic based upon the V2X communication.

8. The vehicle of claim 1, wherein the control module detects the flood characteristic based upon the vehicle location and localized weather data.

9. The vehicle of claim 1, wherein the control module collects the humidity level from a remote weather server via the communication module.

10. The vehicle of claim 1, wherein the control module includes memory, wherein the control module stores the flooding event in the memory and subsequently disconnects from a battery.

11. The vehicle of claim 10, further including a battery management system that is configured to disconnect the control module from the battery.

12. The vehicle of claim 1, further including an alternative power source that is located above a predefined vehicle flood level and is configured to power the control module in response to the control module identifying the flooding event.

13. The vehicle of claim 12, wherein the alternative power source includes a solar panel.

14. The vehicle of claim 1, wherein the control module presents a flood alert to a user upon identifying the flooding event.

15. The vehicle of claim 1, further including an autonomy unit that is configured to autonomously perform motive functions when the flooding event is identified.

16. The vehicle of claim 1, further including an engine control module that is configured to prevent the engine from being started when the flooding event is identified and the engine is inactive.

17. The vehicle of claim 1, wherein, when the flooding event is recorded with the remote server, data of the flooding event is retrievable only by a certified operator and is erasable only by an authorized operator.

18. A method comprising:
    determining a vehicle location via a GPS receiver;
    collecting, via a humidity sensor, an engine humidity measurement responsive to detecting a flood characteristic;
    collecting a humidity level of the vehicle location via a vehicle communication module;
    identifying, via a processor, a flooding event responsive to determining the engine humidity measurement exceeds the humidity level by a predetermined threshold; and
    recording, via the vehicle communication module, the flooding event with a remote server.

* * * * *